United States Patent [19]
Fuller

[11] 3,921,312
[45] Nov. 25, 1975

[54] EDUCATIONAL CONSTRUCTION

[76] Inventor: Craig Fuller, 11380 Poblado Road, San Diego, Calif. 92127

[22] Filed: Nov. 26, 1974

[21] Appl. No.: 527,204

[52] U.S. Cl. ............................ 35/27; 46/23; 46/30; 52/311; 52/590
[51] Int. Cl.² ........................................ A63H 33/06
[58] Field of Search .................. 35/15, 27, 35 J, 72; 46/23, 24, 25, 30; 273/157 R, 160; 52/311, 590

[56]  References Cited
UNITED STATES PATENTS
735,079   8/1903   Fisher ............................... 52/311 X FOREIGN PATENTS OR APPLICATIONS
647,812   12/1950   United Kingdom ................... 52/590

OTHER PUBLICATIONS
"New Mathematical Pastimes" by P. A. MacMahon 1921, pp. 86, 87, 98, 99 only.

Primary Examiner—Harland S. Skogquist
Attorney, Agent, or Firm—Gottlieb, Rackman, Reisman & Kirsch

[57] ABSTRACT

An educational construction, for use by both children and adults, includes a plurality of identical geometrically-shaped construction pieces, which are adapted to be interconnected together to form a variety of construction configurations. Each construction piece is nine-sided, with three of the sides substantially equal in length, the remaining six sides somewhat shorter and substantially equal in length, and with the sides defining various angular relations. Interconnecting projections and grooves are provided to facilitate the interconnection of the construction pieces, one to the other. The construction pieces may be fabricated in a plurality of colors, to add a further variable when the construction pieces are connected together to form the construction configurations.

8 Claims, 9 Drawing Figures

EDUCATIONAL CONSTRUCTION

This invention relates generally to construction configurations and, more particularly, to an educational construction usable by both children and adults and including identical geometrically-shaped construction pieces.

Although there are numerous educational games, toys and/or constructions, both on the market and described in prior-art patents, there always exists the need to provide an educational construction having wide appeal, that is, the educational construction should be usable by both children and adults. Consequently, the educational construction must be relatively easy in concept, so that it can be assembled by a child, yet challenging to also have appeal to adults. Of course, by its very nature, the construction should be "educational," thereby teaching to both children and adults, on the one hand, various concepts, while providing, on the other hand, an enjoyable diversion. Still further, there is the ever-present need to provide an educational construction which is relatively inexpensive to manufacture, yet rugged and durable in assembly and ultimate use.

Accordingly, it is a broad object of the present invention to provide a new and useful educational construction.

A more specific object of the present invention is to provide an educational construction for use by both children and adults.

A still further object of the present invention is to provide an educational construction having a high degree of "play-value."

Another object of the present invention is to provide an educational construction which is relatively inexpensive to fabricate, yet physically rugged.

Another object of the present invention is to provide an educational construction which teaches such concepts as color-coordination and spatial arranging.

Yet a further object of this invention is to provide an educational construction having a finished product which is suitable, if desired, for purposes of framing or display.

These and other objects of the present invention are accomplished by providing an educational construction having identical geometrically-shaped construction pieces adapted to be interconnected together to form a variety of construction configurations. Each of the construction pieces is nine-sided, with three of the sides substantially equal in length and the other six sides somewhat shorter and substantially equal in length. The sides define three interior 60° angles, three interior 90° angles, and three exterior 90° angles. Each of the six "shorter" sides defined interconnecting projections and grooves which are adapted to cooperate with corresponding interconnecting projections and grooves on other of the construction pieces for interconnecting or interlocking the construction pieces in a knock-down fashion, one to the other.

The above brief description of the present invention will be more readily appreciated by reference to the following detailed description of a presently preferred, but nonetheless illustrative embodiment, when taken in conjunction with the following drawings, in which.

Figure 1:
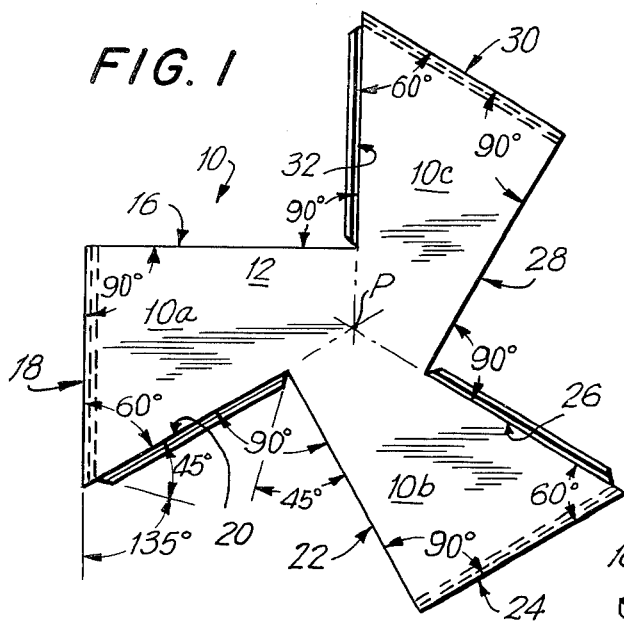
FIG. 1 is a top, plan view of a geometrically-shaped construction piece, according to the present invention.
Figure 2:
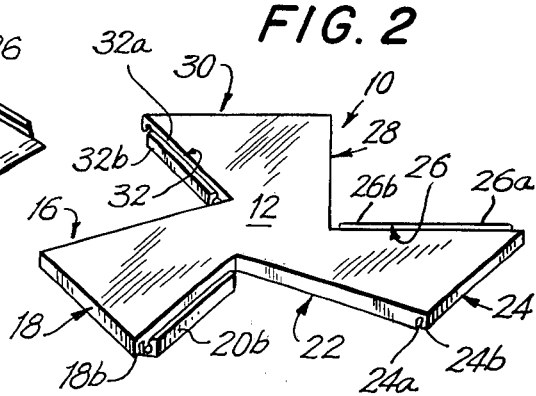
FIG. 2 is a front perspective view, slightly reduced in scale, of the construction piece illustrated in FIG. 1.
Figure 3:
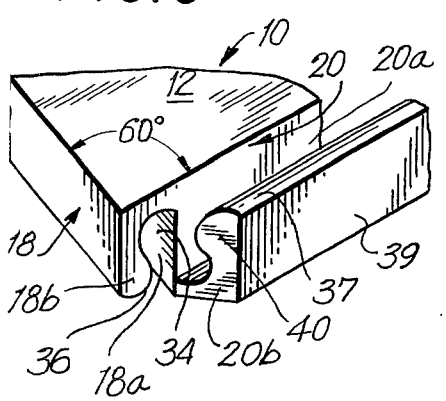
FIG. 3 is a detailed view, slightly larger in scale, showing a corner of the construction piece illustrated in FIG. 2.

Referring now to the drawings and, more particularly, to FIGS. 1–3 thereof, a geometrically-shaped construction piece, utilizable with the educational construction according to the present invention, is generally designated 10. Although construction piece 10 may be fabricated from any material, it is advantageous, both from a standpoint of cost of manufacture and ruggedness and durability of use, for the construction piece to be formed of a plastic or similar material. Although the educational construction according to the present invention includes a plurality of construction pieces, since all of the construction pieces are of identical shape (and differ only in color, as will be explained), only one such construction piece need be described in detail although reference will be made to other construction pieces in explaining the interconnection of the construction pieces.

Figure 5:
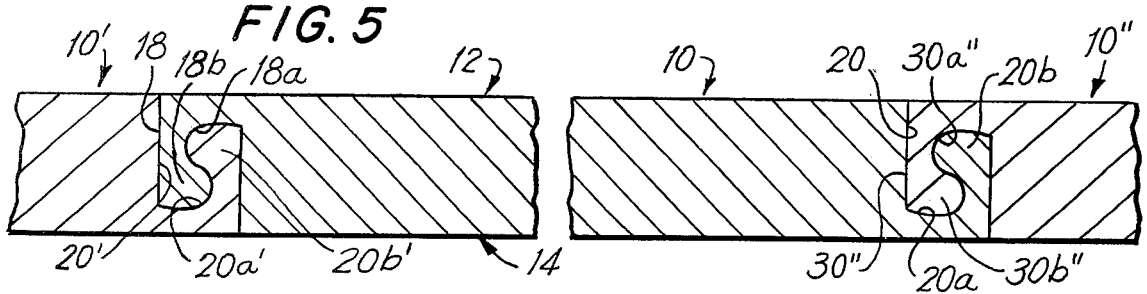
FIG. 5 is a sectional view, enlarged in scale, taken along the line 5—5 of FIG. 4.

Construction piece 10 is relatively flat in configuration, having a flat top surface 12 and a flat bottom surface 14 (see FIG. 5). The construction piece is formed with nine sides or edges, generally designated 16, 18, 20, 22, 24, 26, 28, 30 and 32. These nine sides have a particular relationship to each other, both in length and in orientation, which provides a somewhat jagged appearance for the construction piece.

Specifically, six of the nine sides of construction piece 10 are chosen to be substantially equal in length to each other. Thus, sides 18, 20, 24, 26, 30, and 32 are all substantially equal in length. The remaining three sides, 16, 22 and 28, are also substantially equal in length, one to the other, and these three sides are chosen to be somewhat longer in length than sides 18, 20, 24, 26, 30 and 32.

In addition to their relationship in length, the sides of the construction piece intersect at specific angles. Thus, as indicated in FIG. 1, "longer" side 16 and "shorter" side 18 intersect to define an interior angle substantially equal to 90 degrees; side 18 intersects with side 20 to define an interior angle substantially equal to 60°; and side 20 intersects with side 22 to define an exterior angle substantially equal to 90°. The angular relationship between the sides is then repeated. Thus, sides 22 and 24 intersect and sides 28 and 30 intersect to define interior angles substantially equal to 90°; sides 24 and 26 intersect and sides 30 and 32 intersect to define interior angles substantially equal to 60°; and sides 26 and 28 intersect and sides 32 and 16 intersect to define exterior angles substantially equal to 90 degrees. Finally, if lines were drawn extending along sides 20, 26 and 32, these lines of construction piece 10 would all intersect at a common point, P, as indicated in FIG. 1. Thus, construction piece 10 is formed to have three identical "legs", 10a, 10b and 10c which are disposed symmetrically about the center P of construction piece 10. Each leg, for example leg 10a, is formed by a first long side 16, a second short side 18 and a third short side 20. The second side 18 of leg 10a is disposed away from the center P and connects the first and third sides. Moreover, the first side 16 of leg 10a and the third side 32 of adjacent leg 10c intersect to form the exterior 90° angle; and this angle is equal to the interior 90° angle formed by the intersection of the first and second sides of leg 10a. The interior 60° angle is formed by the intersection of the second and third sides of leg 10a. Thus, the interior 90° angles of each of the legs are adapted to fit into the exterior 90 angles of legs of other construction pieces to "build up" the construction pieces into construction configurations, as will be explained hereinafter.

Thus, it will be appreciated that construction piece 10 has a predetermined geometric shape, defined by the angular relationship between the sides of the construction piece, the lengths associated with these sides, and the intersection of certain of the sides at point P. This relationship is sufficient to uniquely define construction piece 10 and, although the construction piece may be changed somewhat to reflect changes in the corresponding length of all sides, e.g. all of the sides may be smaller or larger so that the overall size of the construction pieces may change, it will be appreciated that the construction pieces, although varying from educational construction to educational construction (if so desired), will all be geometrically "similar," that is, formed of three legs 10a, 10b, 10c having the sides and angular relationships heretofore defined.

In order to connect construction piece 10 to similar construction pieces, the construction piece includes plurality of interconnecting means which are adapted to engage corresponding interconnecting means on another construction piece. These interconnecting means are disposed along the shorter edges of game piece 10, that is, along sides 18, 20, 24, 26, 30 and 32.

Specifically, and referring to FIGS. 1–3, the interconnecting means takes the form of "male" and "female" groove-like elements which are disposed along the shorter sides of the construction piece. Thus, there is disposed adjacent side 18 of the construction piece a generally U-shaped groove or female opening 18a which is disposed inwardly from side wall 18 and which opens downwardly towards the bottom 14 of the construction piece. The groove 18a is defined by a generally straight wall 34 which extends upwardly from bottom surface 14 and by an S-shaped wall 36 which forms part of a male projection or element 18b which extends along side 18. As shown generally in FIG. 5, projection 18b, defined by side 18 and wall 36, extends downwardly from top surface 12 of the construction piece and terminates intermediate top surface 12 and bottom surface 14. As explained hereinafter, male projection 18b is adapted to fit into a corresponding female interconnecting groove, while female interconnecting groove 18a is adapted to receive a corresponding male projection. Identically constructed female grooves 24a, 30a and identically constructed male projections 24b, 30b are disposed inwardly from sides 24 and 30 of the construction piece, respectively.

Three other female interconnecting grooves and male projections (structurally identical) are disposed along sides 20, 26, and 32. Specifically, and referring particularly to FIG. 3, female groove or opening 20a extends outwardly from side 20 of the construction piece, with this groove opening upwardly towards top surface 12. The groove is defined by side 20 and by an S-shaped wall 37 which forms part of a male projection or element 20b which extends outwardly from side 20. The projection 20b is defined by S-shaped wall 37 and a wall 39 which extends perpendicularly upwardly from the bottom surface 14. The projection is also defined by projection end walls 40, 42, discussed hereinafter. The projection terminates before it reaches top surface 12 of the construction piece, thereby enabling the projection to fit into a female groove to interconnect the construction pieces, one to the other. Identically formed female grooves 26a, 32a and identically formed male projections 26b, 32b are similarly disposed outwardly from sides 26 and 32, respectively.

Projection 20b terminates, at end walls 40 and 42, in a manner so that the projection is somewhat flexible and so that the projection will not interfere with the projection of another construction piece adapted to be interconnected with construction piece 10. Specifically, and as is readily apparent from FIG. 1, one end of projection 20b is defined by end wall 40, with end wall 40 angled relative to the logitudinal axis of groove 20a. Similarly, the other end of projection 20b is defined by end wall 42, which similarly is at an angle relative to the longitudinal axis of groove 20a. Since projection 20b terminates at its right hand end before it reaches side 22 (see FIG. 1), the projection is supported by side 20 only, that is, it is free hanging at both ends 40, 42. As a result, the projection is readily flexible so as to easily fit into a corresponding female groove. In a similar manner, the construction of projection 20b at end 40 insures that this end of the projection will not interfere with either projection 18b or groove 18a of the same construction piece nor will it interfere with the projections or grooves of other construction pieces which are adapted to be connected to construction piece 10. Advantageously, wall 40 is disposed at an angle of approximately 135° with side 20, while wall 42 is disposed at an angle of approximately 45° with side 22 (see FIG. 1).

Figure 4:
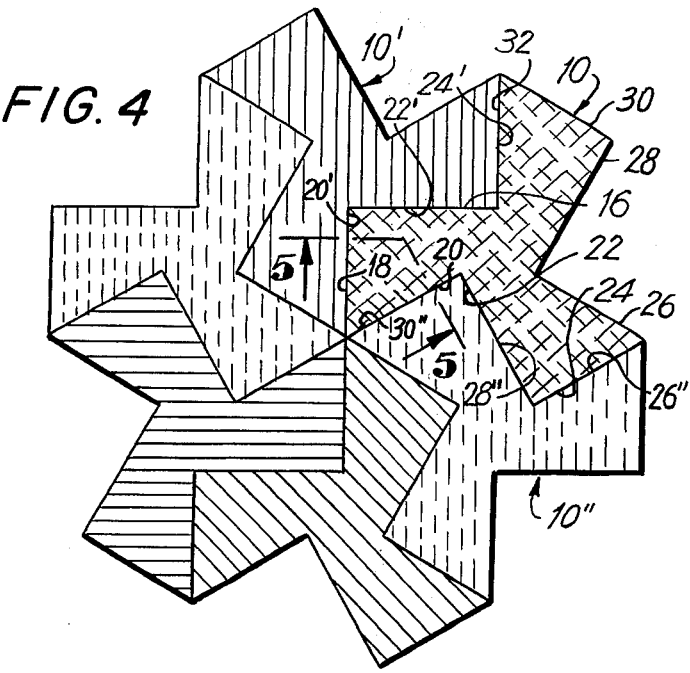
FIG. 4 is a schematic view illustrating the interconnections of a plurality of construction pieces into a relatively elementary construction configuration.

As indicated hereinbefore, the plurality of construction pieces 10 forming the educational construction of the present invention are adapted to be interconnected by the user, be it a child or an adult, to form a variety of shapes or construction configurations. FIG. 4 illustrates the interconnection of six construction pieces 10 into a rather elementary construction configuration. This configuration is "elementary" only in that it is formed of six construction pieces: In fact, FIG. 4 illustrates a basic "building block" configuration from which more complex configurations evolve. For purpose of description, the interconnection of only three construction pieces, 10, 10' and 10", will be described (the prime and double-prime marks are used merely for convenience and for ease of description) it being understood that the other construction pieces are similarly interconnected to form the construction configuration shown in FIG. 4.

Referring to FIGS. 4 and 5, side 18 of construction piece 10 is adapted to engage a side of equal length carried by construction piece 10', e.g., side 20' of construction piece 10'. Specifically, side 18 is adapted to engage side 20'; and these two sides are interconnected together since male projection 18b fits into female groove 20a' of side 20', while male projection 20b' of side 20' is received by female groove 18a of side 18. Thus, a snap-fit is provided between the two sides, by the interconnection of their respective female grooves and male projections. Similarly, side 32 of construction piece 10 abuts side 24' of construction piece 10', with these two sides being held together by projection 32b of side 32 fitting into groove 24a' of side 24' and by projection 24b' of side 24' fitting into groove 32a of side 32. Finally, side 16 of construction piece 10 abuts side 22' of construction piece 10'; and it will be appreciated that these two sides are adapted to abut each other since they are equal in length, being somewhat longer than the four abutting sides of construction pieces 10 and 10'.

In much the same way, construction piece 10 is connected to construction piece 10" in an interlocking fashion with sides 20, 22 and 24 of construction piece 10 abutting respective sides 30", 28" and 26" of construction piece 10". Referring particularly to FIG. 5, side 20 is held next to side 30" since projection 20b of side 20 fits into groove 30a" of side 30" since projection 20b of side 20 fits into groove 30a" of side 30" and since projection 30b" of side 30" fits into groove 20a of side 20. Similarly, the male projections and female grooves disposed along sides 24 and 26" hold these two sides next to each other.

The other construction pieces are interconnected in the same way to form the elementary although "basic" configuration shown in FIG. 4. It should be noted, however, that the interconnection of construction pieces just described is merely illustrative. Thus, there is no absolute requirement, for example, that side 18 of construction piece 10 interconnects with side 20' of construction piece 10' — side 18 could just as well interconnect with another short side of construction piece 10', e.g., side 32', assuming that construction piece 10' is oriented in a different manner. Thus, the only limitation on connecting the various construction pieces, one to the other, is for the short sides having female interconnecting grooves that are disposed inwardly from the sides to interconnect with the shorter side having male projections which extend outwardly from the sides, so that a flush fit is obtained; and for the longer sides of the construction piece to be disposed next to corresponding longer sides of an adjacent construction piece. Although the construction pieces may be oriented in different ways (so that different sides may abut different sides), it will be noted that the construction pieces are interconnected in a way in which the 90° exterior angle of a construction piece "leg" receives the 90 interior angle of a leg of another construction piece.

Several advantages attributable to the shape of the construction piece of the present invention will now be readily appreciated. First, the male projections and female grooves, which act as the interconnecting means, enable the construction pieces to be interconnected securely — nonetheless, the construction pieces may be easily "snap-fitted" one to the other without much effort and may be disconnected or "knocked-down" relatively easily. This is due, in part, to the flexible nature of projections 20b, 26b, and 32b which extend outwardly from their corresponding sides only, without interferring with the adjacent sides of the game piece since the ends of the projections are "angled", see e.g., side 42 which makes a 45° angle with side 22. Second, the angular orientation at the other end of these projections, e.g., end wall 40 of projection 20b makes an angle of approximately 135° with side 18, allows a projection of another game piece to mate with the construction piece at the 60° interior angle thereof without interference (since the other angles formed by the sides of the construction pieces are right angles, it is required that only the ends of the outwardly extending projections adjacent the 60° angles be so oriented). Third, the fact that three of the sides, 18, 24 and 30 have grooves 18a, 24a and 30a which are disposed inwardly from the sides and the fact that the other three shorter sides 20, 26 and 32 have projections 20b, 26b and 32b which extend outwardly from these sides, insure that corresponding construction pieces are connected with the sides flush next to each other. Finally, and as will be explained hereinafter, the three legged unique shape of the construction pieces allows the pieces to be interconnected to form almost an endless number of construction configurations. Specifically, the geometric shape of a construction piece enables the construction pieces to "stack" like a triangle, e.g., the six 60° angles can mate to form 360°, and the pieces can also "step" like a rectangle, e.g., form aig-zag shapes.

Having generally described the structural aspects of the present invention, that is, the structure of a single construction piece and its ability to be interconnected with adjacent identically shaped construction pieces, reference to FIGS. 6–9 will illustrate more complex construction configurations which may be obtainable by interconnecting a plurality of construction pieces. Reference to these figures will also illustrate the various educational aspects obtainable according to the invention.

Figure 6:
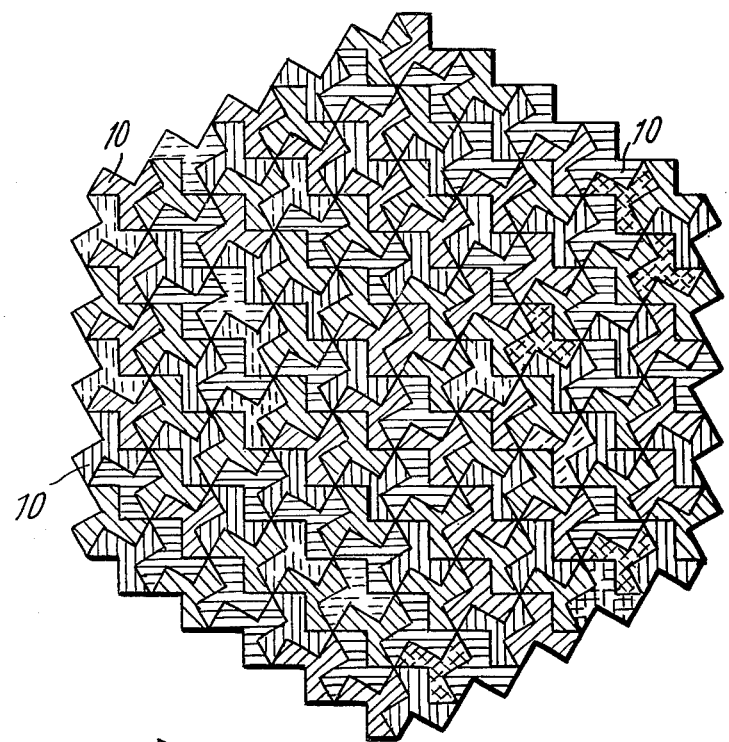
FIG. 6 is a schematic view showing one construction configuration which may be built-up using a plurality of construction pieces, according to the present invention.
Figure 7:
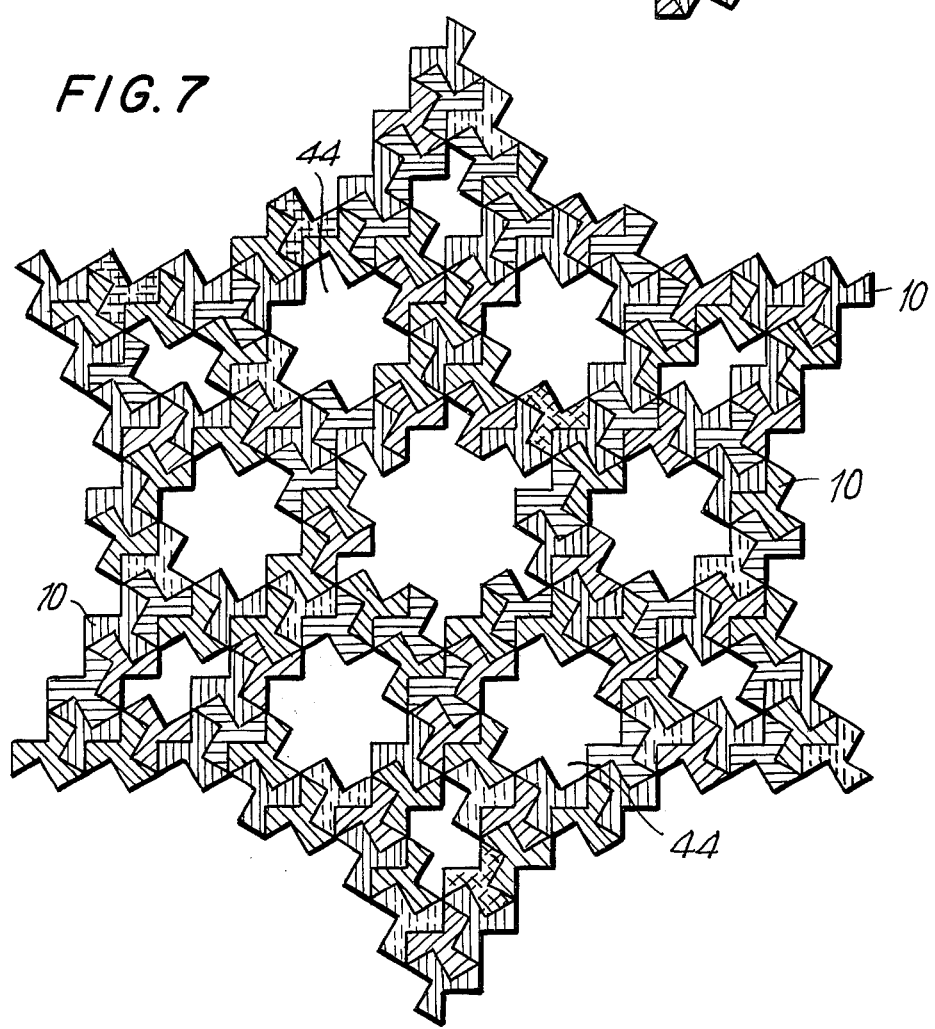
FIG. 7 is a schematic view showing another construction configuration which may be built-up using a plurality of construction pieces, according to the present invention.
Figure 8:
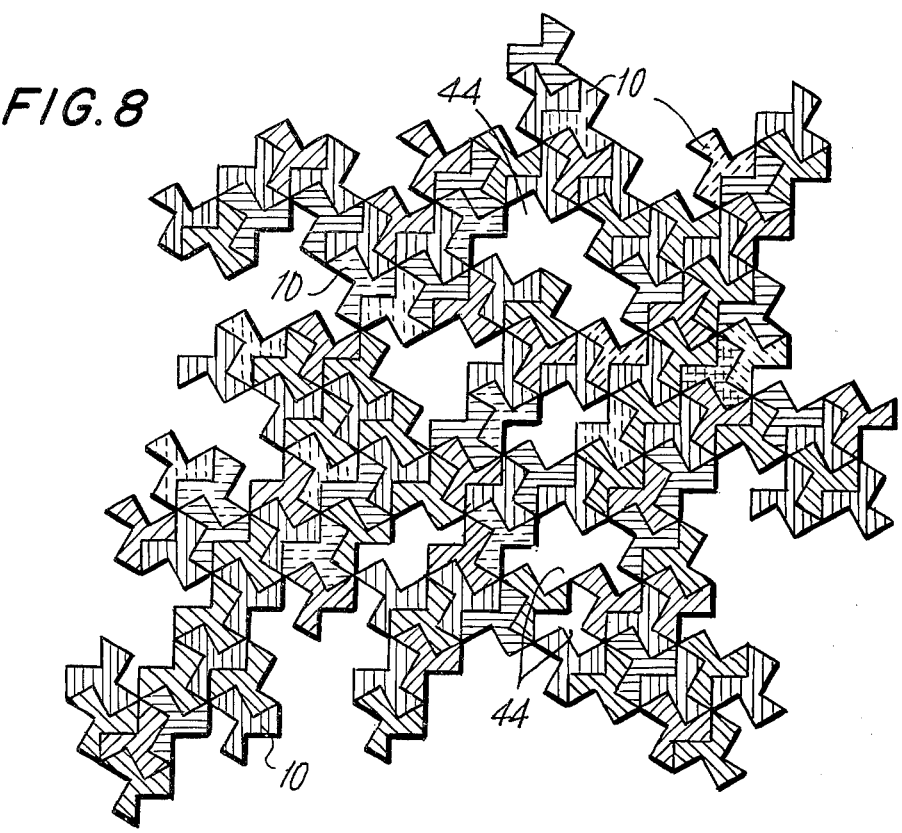
FIG. 8 is a schematic view showing another construction configuration which may be built-up using a plurality of construction pieces, according to the present invention; and, FIG. 9 is a schematic view showing yet another construction configuration which may be built up using a plurality of construction pieces, according to the present invention.
Figure 9:
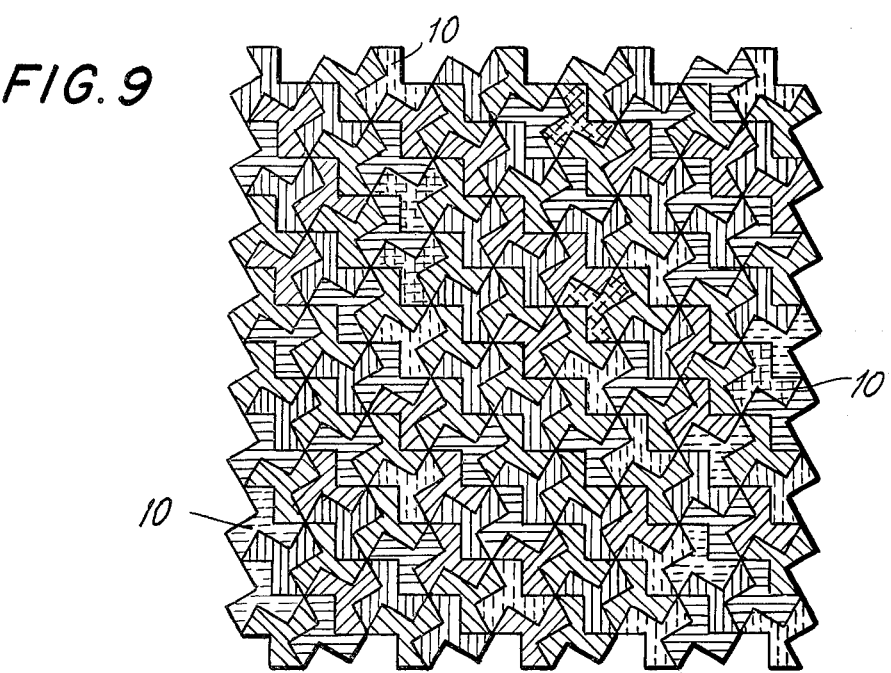

Specifically, the construction piece 10 of the present invention may be interconnected to form an almost unlimited number of construction configurations. For example, FIG. 6 and 9 show two somewhat structured and symmetrical construction configurations obtained by interconnecting a plurality of construction pieces. In FIG. 6 the construction configuration is somewhat circular in overall shape, while in FIG. 9 the construction configuration is somewhat square in overall shape. FIG. 7 shows a construction configuration of interconnecting construction pieces, which although somewhat symmetrical, is nonetheless more free in form than either of the configurations shown in FIGS. 6 or 9. In addition, FIG. 7 shows that the construction pieces 10 may be interconnected in a way so that the construction configuration includes open spaces 44 defined by an absence of construction pieces 10 within the bounds of the overall configuration. On the other hand, FIG. 8 illustrates that the construction configuration obtained by interconnecting the construction pieces is not limited to any symmetrical configuration. Rather, the construction pieces may be interconnected to provide a free-form or abstract overall configuration, which may also have "open" spaces 44.

As will now be explained, by forming the individual construction pieces, although identical in shape, of different colors or shades of color, a further added educational aspect is achieved. For example, and by way of illustration only, construction piece 10 of FIG. 4 may be formed in an orange color, construction piece 10' may be formed in a red color, construction piece 10" may be formed in a yellow color, etc. By fabricating the construction pieces in different colors, not only are the construction pieces connectable to each other to form a variety of construction configurations of different shapes — thereby teaching an understanding of spatial relationships, the formation of symmetrical and asymmetrical configurations and the like — but the construction configurations may also teach an understanding of color relationships and color coordination. Thus, the construction pieces may be connected to form construction configurations which vary not only in shape but in color, as well. This adds another variable or dimension to the creative aspects of the present invention.

More particularly, and by way of example only, the basic configuration of FIG. 4 may be assembled from construction pieces having the following colors (starting with construction piece 10 and going clock-wise): orange, yellow, green, blue, violet, red and the configuration of FIG. 4 will then resemble a "color wheel." In using this basic configuration in building up more complex configurations (see FIGS. 6–9), the inter-relation of colors may be further used. For example, if a yellow construction piece were "combined" with a blue construction piece, i.e. one placed on top of the other, the color obtained would be green (yellow plus blue equals green). Hence, in the actual configuration, a green colored construction piece could be substituted to illustrate this combination. Similarly, red and yellow construction pieces could be substituted by an orange construction piece; violet for red plus blue, etc.

It will be appreciated, therefore, that the present invention provides an educational construction having wide appeal, both to children and adults, since the construction is simple enough for use by children yet challenging enough for use by adults. Concepts of symmetrical and asymmetrical design, spatial relations and color coordination are taught by interconnecting the construction pieces to form unique construction configurations, limited only by the number of pieces available and, of course, by the creative ability of the person using the construction. The interconnecting projections and grooves formed at the sides the construction pieces allow the construction pieces to be connected with each other in a secure yet knock-down fashion. This is particularly useful since it enables completed designs or construction configurations to be vertically displayed, for purposes of framing or the like, if desired. On the other hand, the construction configurations may be easily disassembled, enabling the construction pieces to be rearranged in a different way to form other configurations.

Obviously, other modifications and embodiments are possible in light of the above description. For example, other ways of interconnecting the construction pieces, one to the other, may be provided. For example, the male and female interconnecting projections and grooves may be disposed on other sides of the construction pieces, e.g. the longer sides; and other ways of interconnecting the construction pieces one to the other, are also possible. Yet further, the interconnecting means may be dispensed with, if desired. Moreover, although it is advantageous to fabricate the construction pieces of a plastic material for the purposes of strength, durability and ease of manufacture, it is equally apparent that other materials may be used to form the construction pieces. Also, although the construction pieces are substantially equal in configuration to each other and are of a unique shape, it is apparent that variations in the construction pieces, one to the other, may be inherent in fabrication. Finally, and as explained, the overall size of the construction pieces from construction to construction may be varied so long as the overall unique shape is preserved. It is understood, therefore, that the embodiment heretofore described is merely illustrative of the present invention and other embodiments are possible in light of the foregoing disclosure within the bounds of the present invention, as set forth in the appended claims.

What I claim is:

1. In an educational construction having a plurality of identically-shaped construction pieces adapted to be interconnected to each other to form a variety of construction configurations, the construction piece comprising: three substantially identical legs extending from the center of the construction piece and being disposed symmetrically therearound, each leg having first, second and third sides with said second and third sides substantially equal in length, the second side of each leg being disposed away from the center of the construction piece and connecting the first and third sides of the leg, the first side of the leg and the third side of an adjacent leg intersecting to form a first exterior angle substantially equal to 90°, the first side and the second side of the leg intersecting to form a second interior angle substantially equal to 90° and substantially equal to said first exterior angle, and the second side and the third side of the leg intersecting to form a third interior angle substantially equal to 60°.

2. A construction piece according to claim 1 wherein the third sides of each leg intersect at a common point.

3. An educational construction comprising: a plurality of identically-shaped construction pieces; each of said construction pieces defining three substantially identical legs extending from the center of the construction piece and being disposed symmetrically therearound, each leg having first, second and third sides with said second and third sides substantially equal in length, the second side of each leg being disposed away from the center of said construction piece and connecting the first and third sides of the leg, the first side of the leg and the third side of an adjacent leg intersecting to form a first exterior angle substantially equal to 90°, the first side and the second side of the leg intersecting to form a second interior angle substantially equal to 90° and substantially equal to said first exterior angle, and the second side and the third side of the leg intersecting to form a third interior angle substantially equal to 60°; the first exterior angle of one construction piece receiving the second interior angle of another construction piece to form a construction configuration; and first means disposed along at least one side of said one construction piece adapted to engage second means disposed along at least one side of said another construction piece for releasably connecting said one construction piece to said another construction piece.

4. An educational construction according to claim 3 wherein said construction pieces are colored so that said construction configuration is formed of different colors.

5. An educational construction according to claim 3 wherein said construction configuration includes at least six construction pieces, said construction pieces connected together with respective third interior angles adjacent each other to define 360°.

6. An educational construction according to claim 3 wherein said first means is a female groove and said second means is a male projection which is adapted to engage said female groove to provide a snap-fit connection.

7. An educational construction according to claim 6 wherein said female groove is disposed along a second side of said one construction piece and said male projection is disposed along a third side of said another construction piece.

8. An educational construction according to claim 7 wherein said male projection extends outwardly from and is supported solely by said third side.

* * * * *